(12) United States Patent
Hwang et al.

(10) Patent No.: US 9,586,846 B2
(45) Date of Patent: Mar. 7, 2017

(54) APPARATUS AND METHODS FOR PROCESSING MOLTEN MATERIAL

(71) Applicant: Corning Incorporated, Corning, NY (US)

(72) Inventors: Jaesoo Hwang, Asan-si (KR); Jaeyoung Kim, Asan-si (KR); Bonhyoung Koo, Yongin-si (KR)

(73) Assignee: CORNING INCORPORATED, Corning, NY (US)

( * ) Notice: Subject to any disclaimer, the term of this patent is extended or adjusted under 35 U.S.C. 154(b) by 0 days.

(21) Appl. No.: 14/684,924

(22) Filed: Apr. 13, 2015

(65) Prior Publication Data

US 2016/0297701 A1 Oct. 13, 2016

(51) Int. Cl.

| C03B 5/23 | (2006.01) |
|---|---|
| C03B 5/44 | (2006.01) |
| C03B 5/04 | (2006.01) |
| C03B 5/16 | (2006.01) |
| C03B 5/167 | (2006.01) |
| C03B 7/06 | (2006.01) |

(Continued)

(52) U.S. Cl.
CPC .................. *C03B 5/23* (2013.01); *C03B 5/04* (2013.01); *C03B 5/16* (2013.01); *C03B 5/167* (2013.01); *C03B 5/44* (2013.01); *C03B 7/06* (2013.01); *C03B 5/43* (2013.01); *C03B 17/064* (2013.01)

(58) Field of Classification Search
None
See application file for complete search history.

(56) References Cited

U.S. PATENT DOCUMENTS

| 1,893,061 A | 1/1933 | Pieler |
|---|---|---|
| 3,805,072 A * | 4/1974 | Goerens .................. C03B 18/02 250/342 |
| 7,454,925 B2 | 11/2008 | DeAngelis et al. |

(Continued)

FOREIGN PATENT DOCUMENTS

JP 2003054955 A 2/2003

OTHER PUBLICATIONS

Arya Alborz "Heat Exchangers", http://aryaalborz.com/Projects—HeatExchangers.html, per WaybackMachine available Aug. 27, 2014.*

(Continued)

*Primary Examiner* — Lisa Herring
(74) *Attorney, Agent, or Firm* — Kevin M. Able

(57) ABSTRACT

Methods of processing molten material comprising the step (I) of flowing molten material through an interior of a conduit from a first station to a second station of a glass manufacturing apparatus and the step (II) of cooling the molten material within the interior of the conduit by passing a cooling fluid along an exterior of the conduit. The method further includes the step (III) of directing a travel path of the cooling fluid toward a vertical plane passing through the conduit. In further examples, a glass manufacturing apparatus comprises a first station, a second station, and a conduit configured to provide a travel path for molten material traveling from the first station to the second station. The glass manufacturing apparatus further comprises at least one baffle configured to direct a travel path of cooling fluid toward a vertical plane passing through the conduit.

18 Claims, 5 Drawing Sheets

(51) Int. Cl.
    *C03B 5/43* (2006.01)
    *C03B 17/06* (2006.01)

(56) References Cited

U.S. PATENT DOCUMENTS

| | | |
|---|---|---|
| 8,127,572 B2 | 3/2012 | Dorfeld et al. |
| 8,683,827 B2 | 4/2014 | DeAngelis et al. |
| 8,695,378 B2 | 4/2014 | Thomas |
| 8,720,225 B2 | 5/2014 | Pibladdo |
| 2007/0149380 A1 | 6/2007 | Dorfeld et al. |
| 2010/0192633 A1 | 8/2010 | DeAngelis et al. |
| 2011/0094720 A1* | 4/2011 | Wang .................. F28D 7/1607 165/161 |
| 2014/0123710 A1 | 5/2014 | Lineman et al. |
| 2014/0144183 A1 | 5/2014 | Demirbas et al. |

OTHER PUBLICATIONS

International Search Report and Written Opinion PCT/US2016/026901 Dated Jul. 11, 2016.

* cited by examiner

APPARATUS AND METHODS FOR PROCESSING MOLTEN MATERIAL

FIELD

The present disclosure relates generally to apparatus and methods of processing molten material and, more particularly, to apparatus and methods of processing molten material flowing through an interior of a conduit.

BACKGROUND

It is known to manufacture glass ribbon from molten material. Typically, molten material is processed with a glass manufacturing apparatus including several stations arranged in series. In some examples, a pair of stations are joined with a conduit providing a travel path for molten material traveling from a first station to a second station.

SUMMARY

The following presents a simplified summary of the disclosure in order to provide a basic understanding of some example aspects described in the detailed description.

In accordance with a first aspect, a method of processing molten material comprises the step (I) of flowing molten material through an interior of a conduit from a first station to a second station of a glass manufacturing apparatus. The method further includes the step (II) of cooling the molten material within the interior of the conduit by passing a cooling fluid along an exterior of the conduit. The method still further includes the step (III) of directing a travel path of the cooling fluid toward a vertical plane passing through the conduit.

In one example of the first aspect at least one baffle directs the travel path of the cooling fluid during step (III).

In another example of the first aspect, the at least one baffle includes a first baffle, and step (III) includes directing a first portion of the travel path of the cooling fluid from a first lateral side portion of the conduit toward the vertical plane with the first baffle. In another example, the at least one baffle further includes a second baffle, and step (III) further includes directing a second portion of the travel path of the cooling fluid from a second lateral side portion of the conduit toward the vertical plane with the second baffle.

In yet another example of the first aspect, the at least one baffle includes a deflection panel extending at an angle relative to a travel path of the molten material flowing through the interior of the conduit, and step (III) includes directing the travel path of the cooling fluid with the deflection panel of the baffle. In another example, the at least one baffle further includes a shroud at least partially extending over a top portion of the conduit, and step (III) includes routing the travel path of the cooling fluid with the shroud to be directed by the deflection panel.

In another example of the first aspect, step (III) further directs the travel path of the cooling fluid over a top portion of the conduit.

In still another example of the first aspect, the vertical plane bisects the conduit.

In yet another example of the first aspect, the cooling fluid travels in a direction from the second station toward the first station.

In a further example of the first aspect, the cooling fluid may be substantially free from oxygen. In one example, the cooling fluid comprises nitrogen.

The first aspect can be provided alone or in combination with one or any combination of the examples of the first aspect discussed above.

In accordance with a second aspect, a glass manufacturing apparatus comprises a first station, a second station, and a conduit configured to provide a travel path for molten material traveling from the first station to the second station. The glass manufacturing apparatus further comprises at least one baffle configured to direct a travel path of cooling fluid toward a vertical plane passing through the conduit.

In one example of the second aspect, the first station comprises a mixing chamber.

In another example of the second aspect, the second station comprises a delivery vessel.

In still another example of the second aspect, the at least one baffle includes a deflection panel extending at an angle relative to the travel path provided by the conduit. In one example, an outer end of the deflection panel may be laterally positioned outside the travel path for the molten material. In another example, the deflection panel includes a concave inner surface facing toward the vertical plane.

In another example of the second aspect, the at least one baffle includes a shroud at least partially extending over a top portion of the conduit. In one example, the at least one baffle further includes a deflection panel extending away from the shroud at an angle relative to the travel path of the conduit.

In still another example of the second aspect, the at least one baffle includes a first baffle including a first deflection panel extending at a first angle relative to the travel path provided by the conduit and a second baffle including a second deflection panel extending at a second angle relative to the travel path provided by the conduit, wherein the first deflection panel and the second deflection panel converge toward one another.

The second aspect can be provided alone or in combination with one or any combination of examples of the second aspect discussed above.

It is to be understood that both the foregoing general description and the following detailed description present embodiments of the present disclosure, and are intended to provide an overview or framework for understanding the nature and character of the embodiments as they are described and claimed. The accompanying drawings are included to provide a further understanding of the embodiments, and are incorporated into and constitute a part of this specification. The drawings illustrate various embodiments of the disclosure, and together with the description serve to explain the principles and operations thereof.

BRIEF DESCRIPTION OF THE DRAWINGS

These and other features, aspects and advantages of the present disclosure are better understood when the following detailed description is read with reference to the accompanying drawings, in which.

DETAILED DESCRIPTION

Figure 1:
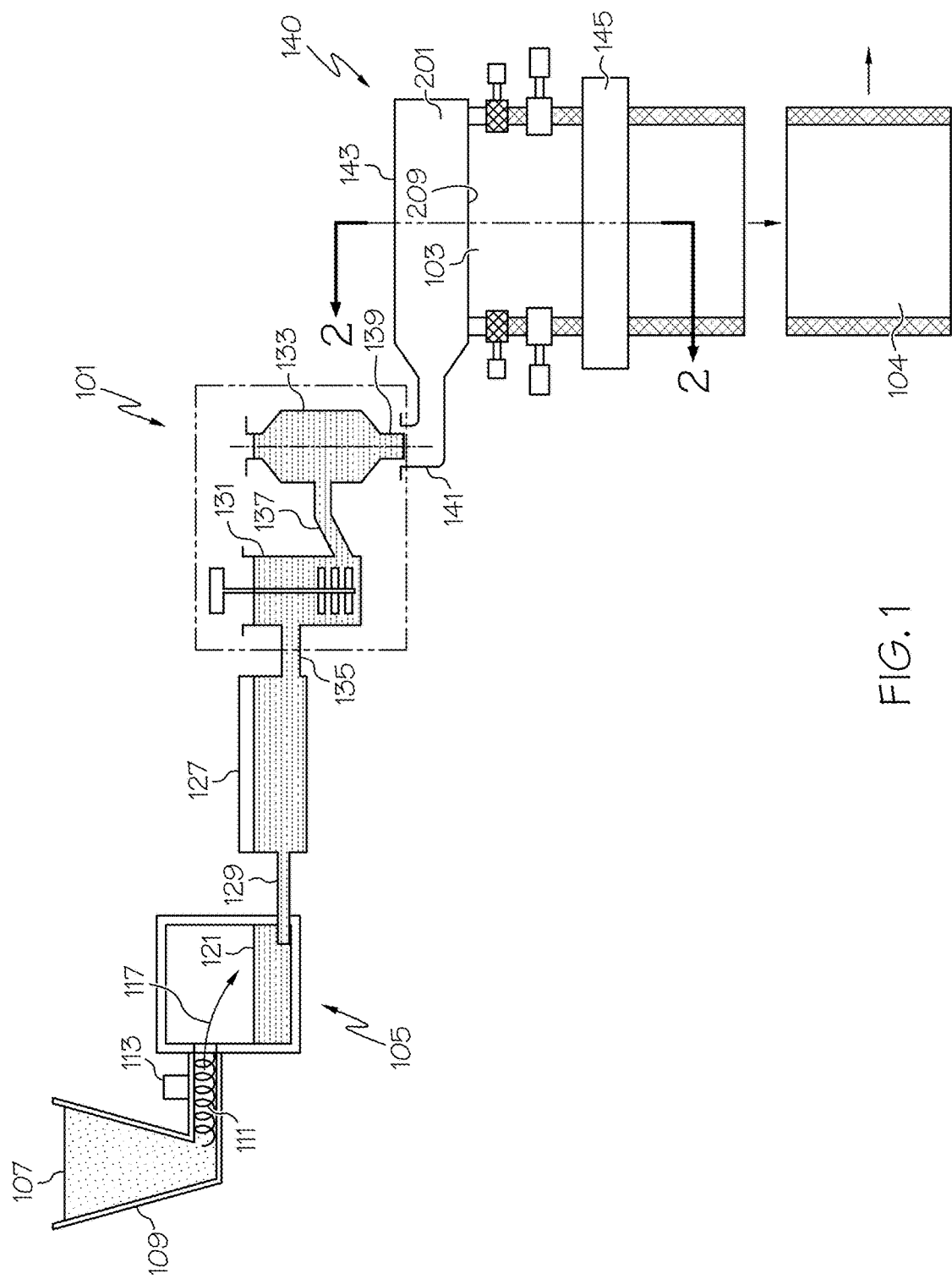
FIG. 1 schematically illustrates an example glass manufacturing apparatus.

Apparatus and methods will now be described more fully hereinafter with reference to the accompanying drawings in which example embodiments of the disclosure are shown. Whenever possible, the same reference numerals are used throughout the drawings to refer to the same or like parts. However, the claims may be embodied in many different forms and should not be construed as limited to the embodiments set forth herein.

Glass sheets produced by apparatus and methods of the present disclosure are commonly used, for example, in display applications, for example liquid crystal displays (LCDs), electrophoretic displays (EPD), organic light emitting diode displays (OLEDs), plasma display panels (PDPs), or the like. In some examples, glass sheets may be separated from a glass ribbon produced by a glass manufacturing apparatus.

In some embodiments, the glass manufacturing apparatus can comprise a slot draw apparatus, float bath apparatus, down-draw apparatus, up-draw apparatus, press-rolling apparatus or other glass manufacturing apparatus as are generally known in the art. By way of example, FIG. 1 schematically illustrates a glass manufacturing apparatus 101 for processing a quantity of molten material for fusion drawing a glass ribbon 103 for subsequent processing into glass sheets 104. The glass manufacturing apparatus 101 can include one or more features shown in FIG. 1. For instance, the glass manufacturing apparatus 101 (e.g., the illustrated fusion down-draw apparatus) can include one or any plurality of the illustrated stations (e.g., a melting vessel 105, a fining vessel 127, a mixing chamber 131, a delivery vessel 133 and a forming vessel 143) and/or features associated with the stations. For example, as shown in FIG. 1, the glass manufacturing apparatus 101 can include all of the illustrated stations arranged in series wherein molten material may sequentially travel through the stations to produce the glass ribbon 103 from the molten material 121.

The melting vessel 105 may be configured to receive batch material 107 from a storage bin 109. The batch material 107 can be introduced by a batch delivery device 111 powered by a motor 113 to introduce a desired amount of batch material 107 into the melting vessel 105, as indicated by arrow 117. The melting vessel 105 may then melt the batch material 107 into the molten material 121.

The fusion draw apparatus 101 can also include the fining vessel 127 that can be located downstream from the melting vessel 105 and coupled to the melting vessel 105 by way of a first conduit 129. In some examples, the molten material 121 may be gravity fed from the melting vessel 105 to the fining vessel 127 by way of the first conduit 129. For instance, gravity may act to drive the molten material 121 to pass through an interior of the first conduit 129 from the melting vessel 105 to the fining vessel 127. Within the fining vessel 127, bubbles may be removed from the molten material 121 by various techniques.

The fusion draw apparatus can further include the mixing chamber 131 that may be located downstream from the fining vessel 127. The mixing chamber 131 can be used to provide a homogenous molten material composition, thereby reducing or eliminating cords of inhomogeneity that may otherwise exist within the fined molten material exiting the fining vessel. As shown, the fining vessel 127 may be coupled to the mixing chamber 131 by way of a second conduit 135. In some examples, the molten material 121 may be gravity fed from the fining vessel 127 to the mixing chamber 131 by way of the second conduit 135. For instance, gravity may act to drive the molten material 121 to pass through an interior of the second conduit 135 from the fining vessel 127 to the mixing chamber 131.

The fusion draw apparatus can further include the delivery vessel 133 that may be located downstream from the mixing chamber 131. The delivery vessel 133 may condition the molten material 121 to be fed into a forming device. For instance, the delivery vessel 133 can act as an accumulator and/or flow controller to adjust and provide a consistent flow of molten material 121 to the forming vessel 143. As shown, the mixing chamber 131 may be coupled to the delivery vessel 133 by way of a third conduit 137. In some examples, molten material 121 may be gravity fed from the mixing chamber 131 to the delivery vessel 133 by way of the third conduit 137. For instance, gravity may act to drive the molten material 121 to pass through an interior of the third conduit 137 from the mixing chamber 131 to the delivery vessel 133.

As further illustrated, a downcomer 139 can be positioned to deliver the molten material 121 from the delivery vessel 133 to an inlet 141 of the forming vessel 143 of a fusion draw machine 140. As discussed more fully below, the fusion draw machine 140 may be configured to draw the molten material 121 into a glass ribbon 103.

The conduits (e.g., the first conduit 129, the second conduit 135, and the third conduit 137) of the glass manufacturing apparatus 101 can include an interior surface comprising a wide variety of shapes. For instance, a cross-sectional profile shape of the interior surface taken perpendicular to a travel path provided for the molten material can comprise a circular shape or a non-circular shape (e.g., an oblong shape, an elliptical shape or other shape configuration). In some examples, the same or geometrically similar cross-sectional profile shape may exist along a length of the conduit. In other examples, geometrically different cross-sectional profile shapes may exist along a length of the conduit. Providing the conduit with a cross-sectional profile shape that is non-circular can increase the efficiency of transferring heat from the molten glass in the conduit by providing a greater surface area to the conduit.

The melting vessel 105 and the forming vessel 143 are typically made from a refractory material, for example refractory (e.g. ceramic) brick. The glass manufacturing apparatus 101 may further include components that are typically made from platinum or platinum-containing metals for example platinum-rhodium, platinum-iridium and combinations thereof, but which may also comprise such refractory metals for example molybdenum, palladium, rhenium, tantalum, titanium, tungsten, ruthenium, osmium, zirconium, and alloys thereof and/or zirconium dioxide. The platinum-containing components can include one or more of the first conduit 129, the fining vessel 127, the second conduit 135, the mixing chamber 131, the third conduit 137, the delivery vessel 133, the downcomer 139 and the inlet 141.

Figure 2:
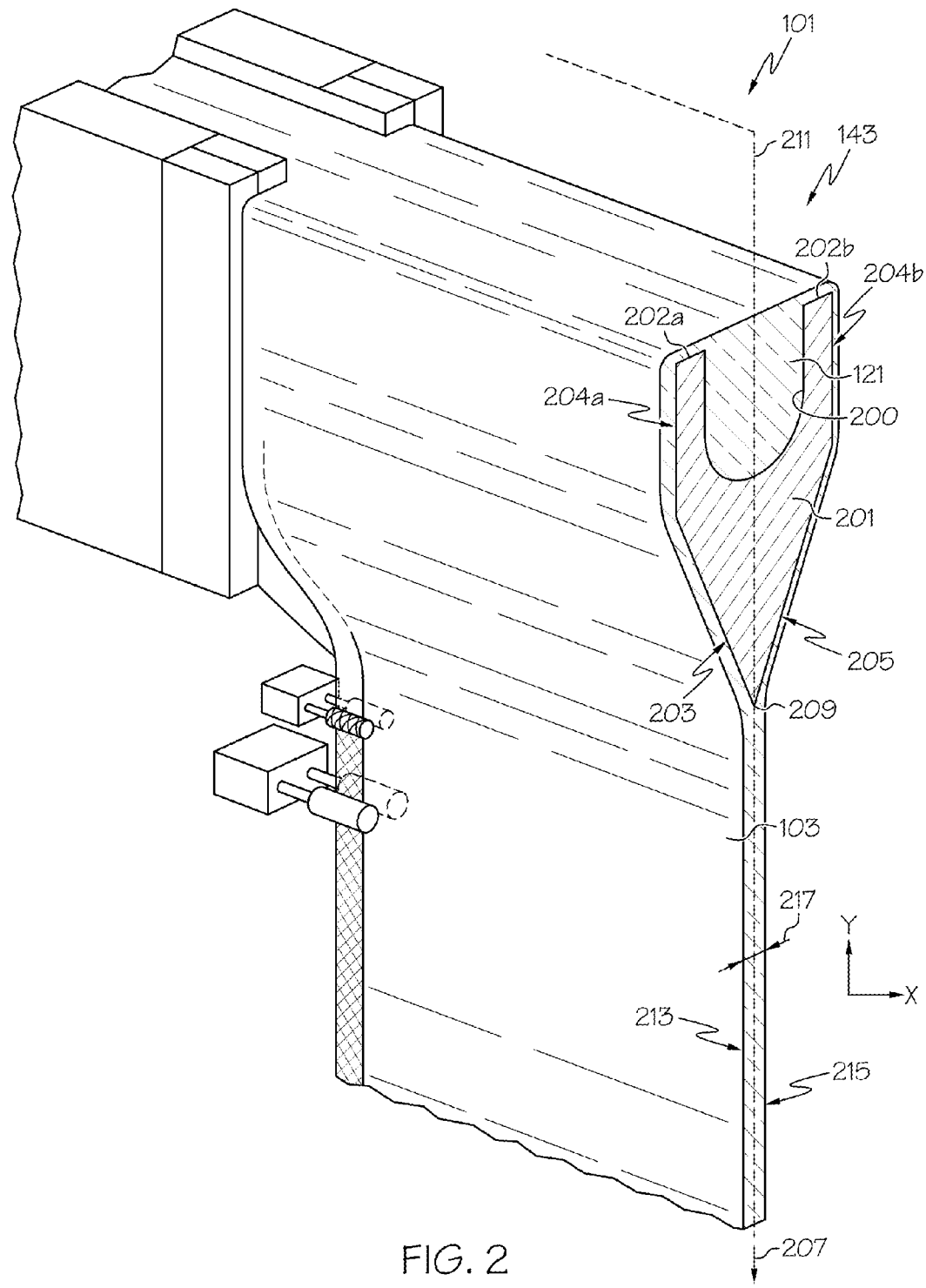
FIG. 2 illustrates a cross-sectional perspective view of the glass manufacturing apparatus along line 2-2 of FIG. 1.

FIG. 2 is a cross-sectional perspective view of the glass manufacturing apparatus 101 along line 2-2 of FIG. 1. As shown, the forming vessel 143 includes a forming wedge 201 comprising a pair of downwardly inclined forming surface portions 203, 205 extending between opposed ends of the forming wedge 201. The pair of downwardly inclined forming surface portions 203, 205 converge along a draw direction 207 to form a root 209. A draw plane 211 extends through the root 209 wherein the glass ribbon 103 may be drawn in the draw direction 207 along the draw plane 211. As shown, the draw plane 211 can bisect the root 209 although the draw plane 211 may extend at other orientations with respect to the root 209.

Referring to FIG. 2, in one example, the molten material 121 can flow into a trough 200 of the forming vessel 143. The molten material 121 can then simultaneously flow over corresponding weirs 202a, 202b and downward over the outer surfaces 204a, 204b of the corresponding weirs 202a, 202b. Respective streams of molten material then flow along the downwardly inclined forming surface portions 203, 205 to the root 209 of the forming vessel 143, where the flows converge and fuse into the glass ribbon 103. The glass ribbon 103 may then be drawn off the root 209 in the draw plane 211 along draw direction 207.

As shown in FIG. 2, the glass ribbon 103 can be drawn from the root 209 with a first major surface 213 and a second major surface 215. As shown, the first major surface 213 and the second major surface 215 face opposite directions with a thickness 217 defined between the first major surface 213 and the second major surface 215. Although aspects of the disclosure may be beneficial to produce many alternative thicknesses (e.g., including thicknesses of greater than 1 mm or less than 50 μm, including all ranges and sub-ranges therebetween), in some examples, the thickness 217, for example a thickness at a central portion of glass ribbon 103, can be less than or equal to about 1 mm, for example, from about 50 μm to about 750 μm, for example from about 100 μm to about 700 μm, for example from about 200 μm to about 600 μm, for example from about 300 μm to about 500 μm.

In one example, glass ribbon 103 drawn off the root 209 may be separated into individual glass sheets 104 with a glass separation apparatus 145. Alternatively, although not shown, the glass ribbon may be passed through further processing stations and/or may be stored as a roll of glass ribbon rather than being immediately separated into individual glass sheets 104.

In some examples, there may be a desire to cool molten material traveling within one or more of the conduits (e.g., the first conduit 129, second conduit 135, third conduit 137, etc.) between adjacent stations (e.g., the melting vessel 105, the fining vessel 127, the mixing chamber 131, the delivery vessel 133 and the forming vessel 143) of the glass manufacturing apparatus 101. Discussion of cooling will be described with respect to the third conduit 137 extending between a first station (e.g., the mixing chamber 131) and a second station (e.g., the delivery vessel 133) of the glass manufacturing apparatus 101. Although not shown, the concepts of the disclosure may be applied to any of the other illustrated conduits (e.g., the first conduit 129, the second conduit 135) or any other conduit in other example glass manufacturing apparatus. Moreover, the illustrated stations are only one example configuration wherein the stations are arranged in series with the fining vessel 127 positioned downstream from the melting vessel 105, the mixing chamber 131 positioned downstream from the fining vessel 127, the delivery vessel 133 positioned downstream from the mixing chamber 131, and the forming vessel 143 positioned downstream from the delivery vessel 133. In some examples, more or less stations may be provided and/or the stations may be arranged in a different order wherein concepts of the disclosure may be applied to cool molten glass within a conduit providing a travel path for molten material traveling between stations in the series of stations.

Figure 3:
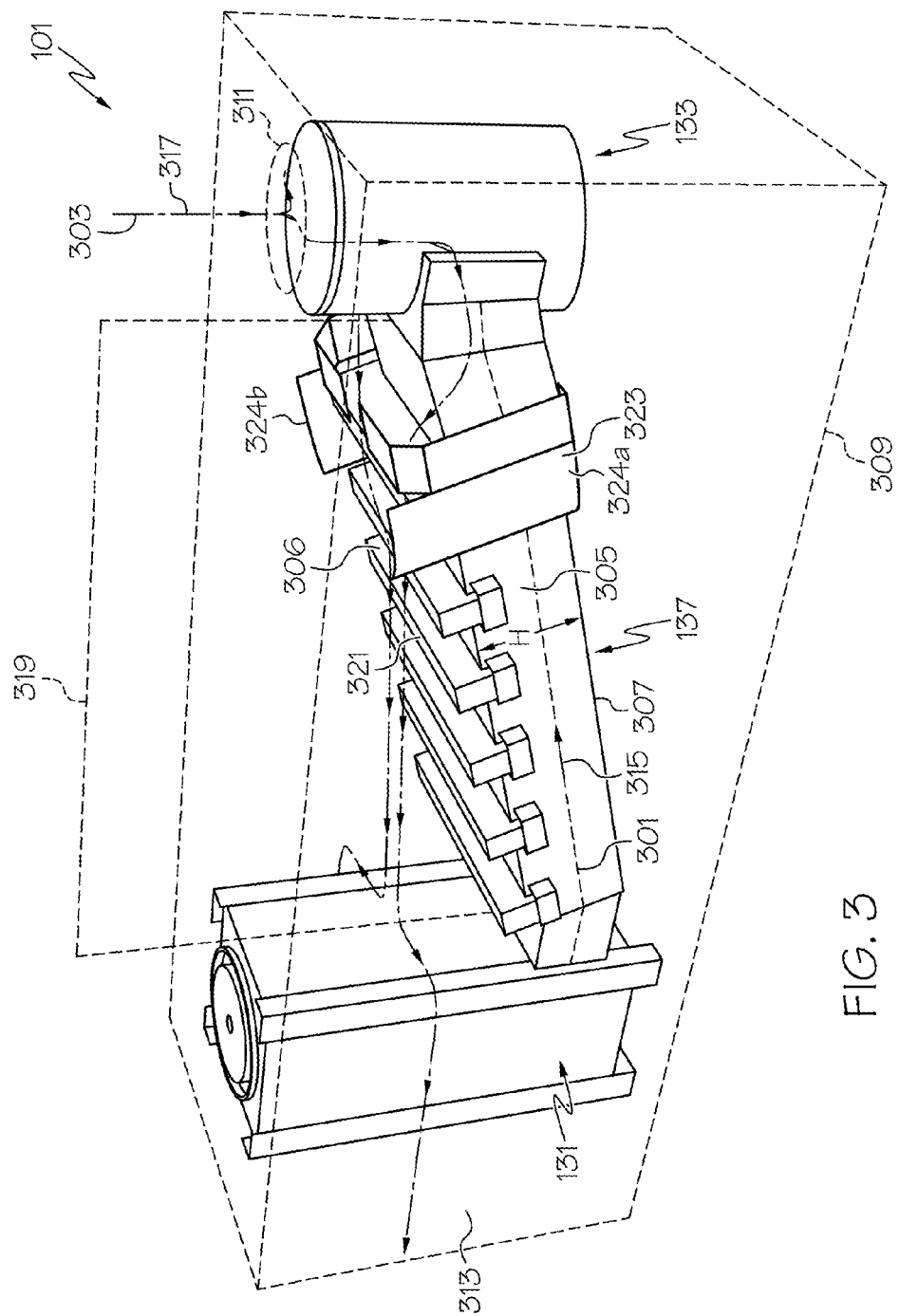
FIG. 3 is a schematic perspective view illustrating a travel path of cooling fluid being directed toward a vertical plane through a conduit.

Turning to FIG. 3, by way of example, the glass manufacturing apparatus 101 includes a first station that may comprise the illustrated mixing chamber 131. The glass manufacturing apparatus 101 may further include a second station that may comprise the illustrated delivery vessel 133. The glass manufacturing apparatus still further includes the third conduit 137. As illustrated schematically in FIG. 3, the third conduit 137 can be configured to provide a travel path 301 for the molten material 121 traveling in a direction 315 from the first station to the second station.

There may be a desire to lower the temperature of the molten material 121 from a relatively high temperature in the mixing chamber 131 to a relatively low temperature in the delivery vessel 133. Lowering the temperature of the molten material 121 can be desirable to provide a desired molten material property (e.g., viscosity) for processing the molten material 121 into the glass ribbon 103 with the fusion draw machine 140.

In one example, cooling fluid 303, such as gas, may be passed along an exterior 305 of the conduit 137 to achieve an increased cooling rate of the molten material within the conduit 137. Indeed, a relatively cool fluid may pass along the conduit 137 to provide convective heat transfer, thereby removing heat from the conduit 137 that consequently reduces the temperature of the molten material 121 within the interior of the conduit 137. The conduit 137 may include a core 307 fabricated from refractory metals (e.g., platinum or platinum-containing metals) that defines the interior of the conduit defining the travel path 301. The conduit 137 can include other features such as coverings, coatings, or support structures in addition to the core 307. For instance, as partially schematically illustrated, the conduit may include support structures 306 that may facilitate support of a core 307 of the conduit 137. The cooling fluid 303 may be passed along the exterior 305 of the conduit 137 such as the exterior of the core 307, the support structures 306 or other features of the conduit 137.

As shown in FIG. 3, the conduit 137 may optionally be placed within a containment area 309. As further shown in FIG. 3, the first station (e.g., the mixing chamber 131) and the second station (e.g., the delivery vessel 133) may also be placed in the containment area 309. Placing the conduit 137, the first station and the second station within the containment area 309 can help guide a controlled quantity of fluid to travel along a travel path from an upstream portion 311 of the containment area 309 to a downstream portion 313 of the containment area 309. Moreover, the containment area 309 can be designed to place the conduit 137, first station and second station within an atmosphere that may be substantially free from oxygen. As such, oxidation of portions of the glass manufacturing apparatus 101 can be minimized, such as prevented, to avoid contaminating the molten material being processed by the glass manufacturing apparatus 101. In some examples, the cooling fluid may be substantially free from oxygen and comprise an inert gas, such as nitrogen, although the cooling fluid may comprise other chemical elements in further examples.

In operation, molten material 121 may travel along the travel path 301 of the conduit 137 in the direction 315 from the first station (e.g., the mixing chamber 131) toward the second station (e.g., the delivery vessel 133). Optionally, the cooling fluid may travel along a path in a direction from the second station toward the first station. Providing a cooling fluid that flows in the general opposite direction of the flow of molten material can provide enhanced convective heat transfer near the second station since the temperature difference between the cooling fluid and the conduit 137 will be higher near the second station than near the first station.

There is a desire to quickly and efficiently reduce the temperature of the molten material 121 within the interior of the conduit 137 to provide the desired temperature in the second station (e.g., delivery vessel 133). Providing increased heat transfer can allow for increased flow of molten material within the conduit, thereby allowing for an increase rate of glass ribbon production. Moreover, providing increased heat transfer can reduce the length of the conduit that needs to be provided. Indeed, a relatively long conduit used to cool with a less efficient technique may be significantly shortened with more efficient heat transfer. Providing a relatively short conduit can be beneficial to reduce the quantity of expensive refractory metals used to produce the conduit.

Figure 4:
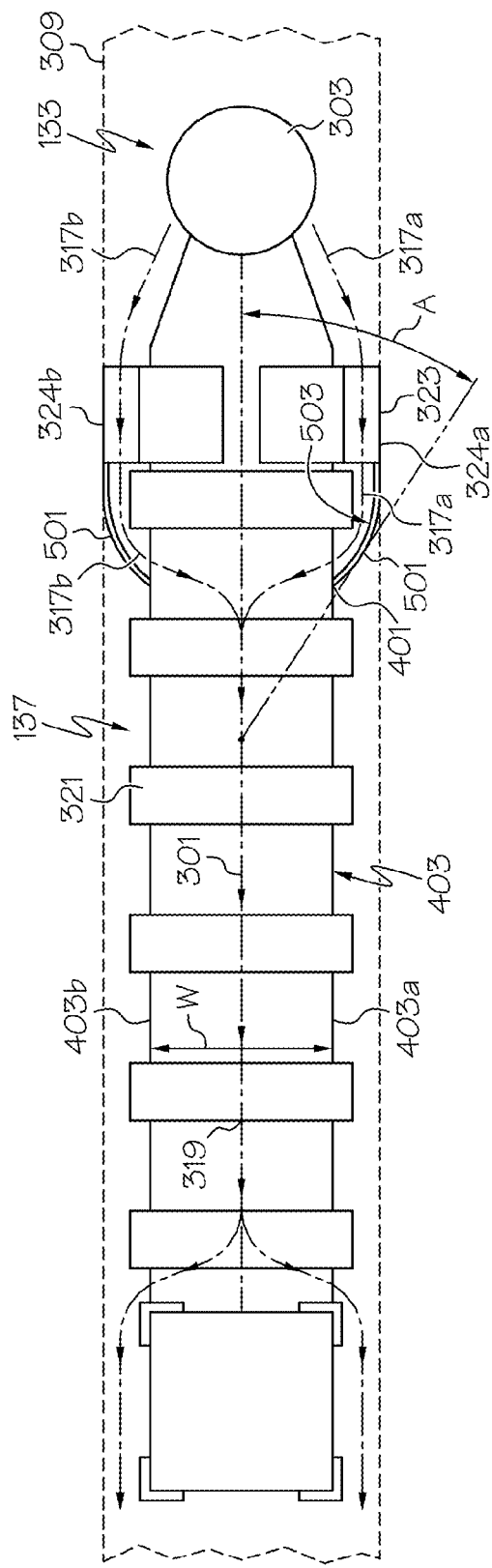
FIG. 4 schematically illustrates a top view of FIG. 3.

As can be appreciated by FIGS. 3 and 4, the conduit 137 may include a height "H" that may be less than the width "W". Such designs may be beneficial to provide an oblong or elliptical shape that can provide enhanced heat transfer of the molten material traveling within the conduit. In order to increase heat transfer, the glass manufacturing apparatus 101 may include at least one baffle configured to direct a travel path 317 of the cooling fluid 303 toward a vertical plane 319 passing through the conduit 137. As shown, the vertical plane 319 passes through the top and bottom of the conduit 137 transverse to the width "W" of the conduit 137. Moreover, as shown in FIG. 4, in some examples, the vertical plane 319 bisects the conduit 137. Directing the cooling fluid 303 toward the vertical plane 319 can encourage the cooling fluid to travel along the relatively greater width "W" of the conduit 137 to enhance heat transfer.

Figure 5:
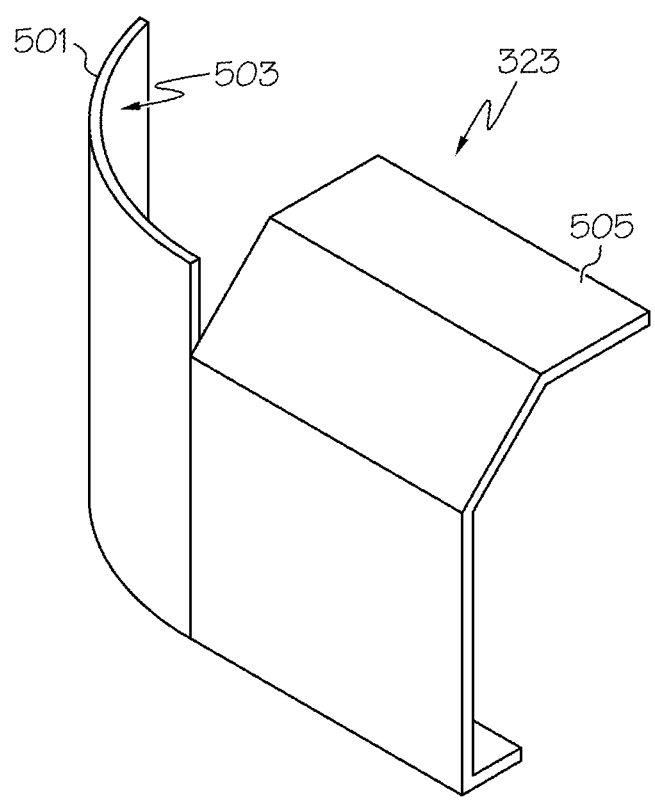
FIG. 5 illustrates an example baffle configured to direct the travel path of the cooling fluid.

As shown in FIGS. 4 and 5 the baffle 323 can include a deflection panel 501 that may extend at an angle "A" relative to the travel path 301 provided by the conduit 137. The angle "A" can be measured by a surface extending from the deflection panel 501. For instance, in the illustrated example, the angle "A" can be measured from a surface that extends tangent to a curved surface of the deflection panel 501. As illustrated, the angle "A" can be an acute angle that permits gradual diversion of the cooling fluid 303 toward the vertical plane 319. Moreover, as shown, the deflection panel 501 can include a concave inner surface 503 facing toward the vertical plane 319. The concave inner surface 503 can further provide a gradual diversion of the cooling fluid 303 to reduce an undesired restriction of fluid flow. In other embodiments, the deflection panel 501 and inner surface 503 can be substantially straight.

As further illustrated, the baffle can include an optional shroud 505 that may at least partially extend over the top portion 321 of the conduit 137. The shroud 505 may route the travel path of the cooling fluid into the deflection panel 501. As shown in FIG. 4, the deflection panel 501 can extend away from the shroud 505 at the angle "A" relative to the travel path of the conduit. Furthermore, an outer end 401 of the deflection panel 501 may be laterally positioned outside the travel path for the molten material. Indeed, in one example, the deflection panel 501 may extend away from the shroud at an angle with the outer end 401 actually abutting a lateral side 403 of the conduit 137. Positioning the outer end 401 to be laterally positioned outside the travel path, such as abutting the lateral side 403 of the conduit 137, can help direct a significant portion, such as all, of the corresponding cooling fluid toward the vertical plane 319. As such, the baffle can direct the cooling fluid to travel along the top portion 321 (or bottom portion) of the conduit rather than the lateral sides 403 that has a greater surface area than the lateral sides of the conduit, thereby providing increased convective heat transfer.

Although a single deflection panel may be provided, as shown in FIGS. 3 and 4, the at least one baffle can include a first baffle 324a and a second baffle 324b. As shown in FIG. 4, the first baffle 324a can be associated with a first lateral side portion 403a of the conduit 137 and the second baffle 324b can be associated with a second lateral side portion 403b of the conduit 137. As shown, the first baffle 324a can be identical or similar to the baffle 323 illustrated in FIG. 5. Likewise, the second baffle 324b can be similar or identical to a mirror image of the baffle 323 illustrated in FIG. 5. As shown in FIG. 4, the first baffle 324a includes a first deflection panel extending at a first angle (e.g., angle "A") relative to the travel path provided by the conduit 137 and the second baffle 324b likewise includes a second deflection panel 501 extending at a second angle (e.g., angle "A") relative to the travel path provided by the conduit 137. As shown, the first deflection panel and the second deflection panel may converge toward one another.

Methods of processing molten material will now be discussed. The method can include the step of flowing molten material 121 through an interior of a conduit from a first station to a second station of the glass manufacturing apparatus. The first station can comprise the melting vessel 105, the fining vessel 127, the mixing chamber 131, the delivery vessel 133, or other station of the glass manufacturing apparatus. The second station can comprise the fining vessel 127, the mixing chamber 131, the delivery vessel 133, the forming vessel 143, or other station of the glass manufacturing apparatus. For example, as shown in FIGS. 1, 3 and 4, the first station can comprise the mixing chamber 131 and the second station can comprise the delivery vessel 133 positioned downstream from the mixing chamber 131. Referring to FIG. 3, molten material flows through the interior of the conduit 137 along the travel path 301 from the first station (e.g., the mixing chamber 131) to the second station (e.g., the delivery vessel 133) of the glass manufacturing apparatus 101.

The method further includes the step of cooling the molten material 121 within the interior of the conduit 137 by passing the cooling fluid 303 along the exterior 305 of the conduit 137. Optionally, the cooling fluid may be substantially free from oxygen. In some particular examples, the cooling fluid may comprise nitrogen although other chemical elements may be used that inhibit, such as prevent, oxidation of the conduit 137. As shown in FIG. 3, the cooling fluid may optionally travel in a direction from the second station (e.g., the delivery vessel 133) to the first station (e.g., the mixing chamber 131). As mentioned previously, providing opposite flow directions of the cooling fluid and the molten material may enhance the temperature differential, and consequently the heat transfer rate, at the portion of the conduit adjacent the delivery vessel 133.

The method can further include the step of directing the travel path 317 of the cooling fluid 303 toward the vertical plane 319 passing through the conduit 137. In one example, the at least one baffle 324a, 324b directs the travel path 317 of the cooling fluid 303. For instance, as shown in FIGS. 3 and 4, the at least one baffle can include the first baffle 324a that directs at least a first portion 317a of the travel path 317 of the cooling fluid 303 from the first lateral side portion 403a of the conduit 137 toward the vertical plane 319. In another example, as further illustrated in FIGS. 3 and 4, the at least one baffle can further include the second baffle 324b that similarly directs a second portion 317b of the travel path 317 of the cooling fluid 303 from the second lateral side portion 403b of the conduit 137 toward the vertical plane 319. As shown in FIG. 4, the first portion 317a and the second portion 317b of the travel path 317 may converge together towards the vertical plane 319 passing through the conduit 137. Indeed, first and second portions 317a, 317b of the travel path may be directed away from a lateral location outside the vertical footprint of the conduit 137 shown in FIG. 4 (i.e., laterally outside the first and second lateral side portions 403a, 403b) toward the vertical plane 319 passing through the conduit 137. Consequently, portions of the cooling fluid traveling along the first and second portions 317a, 317b of the travel path can be redirected to travel along the top portion 321 (or bottom portion) of the conduit to increase the rate of heat transfer. For example, as mentioned previously, the top portion 321 and/or the bottom portion may have a larger surface area when compared to the first and second lateral side portions 403a, 403b. Consequently increased heat transfer rates can be achieved by directing the cooling fluid to travel along the top portion and/or the bottom portion of the conduit rather than traveling along one or both of the lateral side portions.

Still further, directing cooling fluid to travel along the top and/or bottom portions may reduce or prevent formation of stagnant areas with little or no flow of cooling fluid. Indeed, the redirected cooling fluid will provide increased cooling fluid flow across the otherwise stagnant areas to further increase the rate of convective heat transfer.

In examples, with a concave inner surface 503, the deflection panels 501 may provide a relatively smooth transition to avoid eddies, turbulence and/or pressure drops that may otherwise occur with an abrupt change in direction by other panel configurations. Although not shown, the deflection panel may comprise a substantially flat panel although other configurations may be provided in further examples.

In further examples, the baffle can include the shroud 505 discussed above. If provided, the shroud can route the travel path of the cooling fluid into the deflection panel, wherein the deflection panel subsequently directs the travel path toward the vertical plane 219 passing through the conduit 137.

It will be apparent to those skilled in the art that various modifications and variations can be made to the present disclosure without departing from the spirit and scope of the invention. Thus, it is intended that the present invention cover the modifications and variations of this disclosure provided they come within the scope of the appended claims and their equivalents.

What is claimed is:

1. A method of processing molten material comprising the steps of:
   (I) flowing molten material through an interior of a conduit along a travel path from a first station to a second station of a glass manufacturing apparatus;
   (II) cooling the molten material within the interior of the conduit by passing a cooling fluid along an exterior of the conduit; and
   (III) directing a first portion of a travel path of the cooling fluid away from a lateral location outside of a vertical footprint of the conduit toward a vertical plane passing through the conduit such that the first portion of the travel path of the cooling fluid is redirected to travel along a top portion or a bottom portion of the conduit in a direction parallel to the travel path of the molten material to increase the rate of heat transfer from the molten material,
   wherein at least one baffle directs the travel path of the cooling fluid during step (III), the at least one baffle including a deflection panel extending at an angle relative to the travel path of the molten material flowing through the interior of the conduit, and step (III) includes directing the first portion of the travel path of the cooling fluid with the deflection panel of the at least one baffle.

2. The method of claim 1, wherein the at least one baffle includes a first baffle, and step (III) includes directing the first portion of the travel path of the cooling fluid away from the lateral location outside of the vertical footprint of the conduit toward the vertical plane with the first baffle.

3. The method of claim 2, wherein the at least one baffle further includes a second baffle, and step (III) further includes directing a second portion of the travel path of the cooling fluid away from another lateral location outside of the vertical footprint of the conduit toward the vertical plane with the second baffle.

4. The method of claim 1, wherein the at least one baffle further includes a shroud at least partially extending over a top portion of the conduit, and step (III) includes routing the first portion of the travel path of the cooling fluid with the shroud to be directed by the deflection panel.

5. The method of claim 1, wherein the vertical plane bisects the conduit.

6. The method of claim 1, wherein the cooling fluid travels in a direction from the second station toward the first station.

7. The method of claim 1, wherein the cooling fluid is substantially free from oxygen.

8. The method of claim 7, wherein the cooling fluid comprises nitrogen.

9. The method of claim 1, wherein a portion of the deflection panel extends in a direction of the travel path of the cooling fluid and inwardly toward a lateral side of the conduit to an outer end that is laterally positioned outside of the travel path of the molten material.

10. The method of claim 9, wherein the outer end of the deflection panel abuts the lateral side of the conduit.

11. A method of processing molten material comprising the steps of:
    (I) flowing molten material through an interior of a conduit from a first station to a second station of a glass manufacturing apparatus;
    (II) cooling the molten material within the interior of the conduit by passing a cooling fluid along an exterior of the conduit; and
    (III) routing a travel path of the cooling fluid with a shroud of at least one baffle, the shroud at least partially extending over a top portion of the conduit, the shroud routing the travel path to a deflection panel that directs the travel path of the cooling fluid toward a vertical plane passing through the conduit with the deflection panel extending at an angle relative to a travel path of the molten material flowing through the interior of the conduit.

12. The method of claim 11, wherein the at least one baffle includes a first baffle, and step (III) includes directing a first portion of the travel path of the cooling fluid from a first lateral side portion of the conduit toward the vertical plane with the first baffle.

13. The method of claim 12, wherein the at least one baffle further includes a second baffle, and step (III) further includes directing a second portion of the travel path of the cooling fluid from a second lateral side portion of the conduit toward the vertical plane with the second baffle.

14. The method of claim 11, wherein step (III) further directs the travel path of the cooling fluid over a top portion of the conduit.

15. The method of claim 11, wherein the vertical plane bisects the conduit.

16. The method of claim 11, wherein the cooling fluid travels in a direction from the second station toward the first station.

17. The method of claim 11, wherein the cooling fluid is substantially free from oxygen.

18. The method of claim 17, wherein the cooling fluid comprises nitrogen.

* * * * *